May 8, 1945.  A. J. L. HUTCHINSON ET AL  2,375,560
TREATMENT OF GASES
Filed Oct. 27, 1941  3 Sheets-Sheet 1
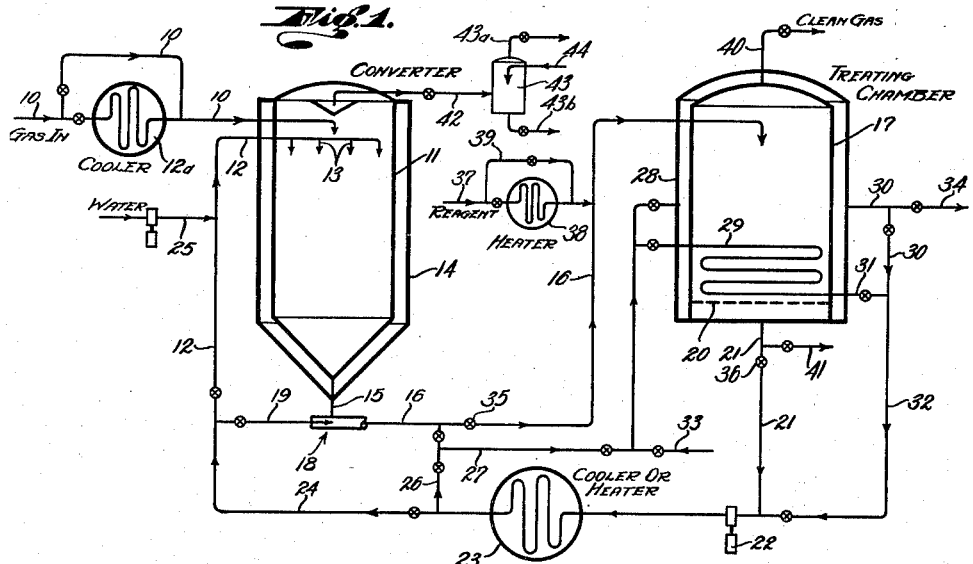
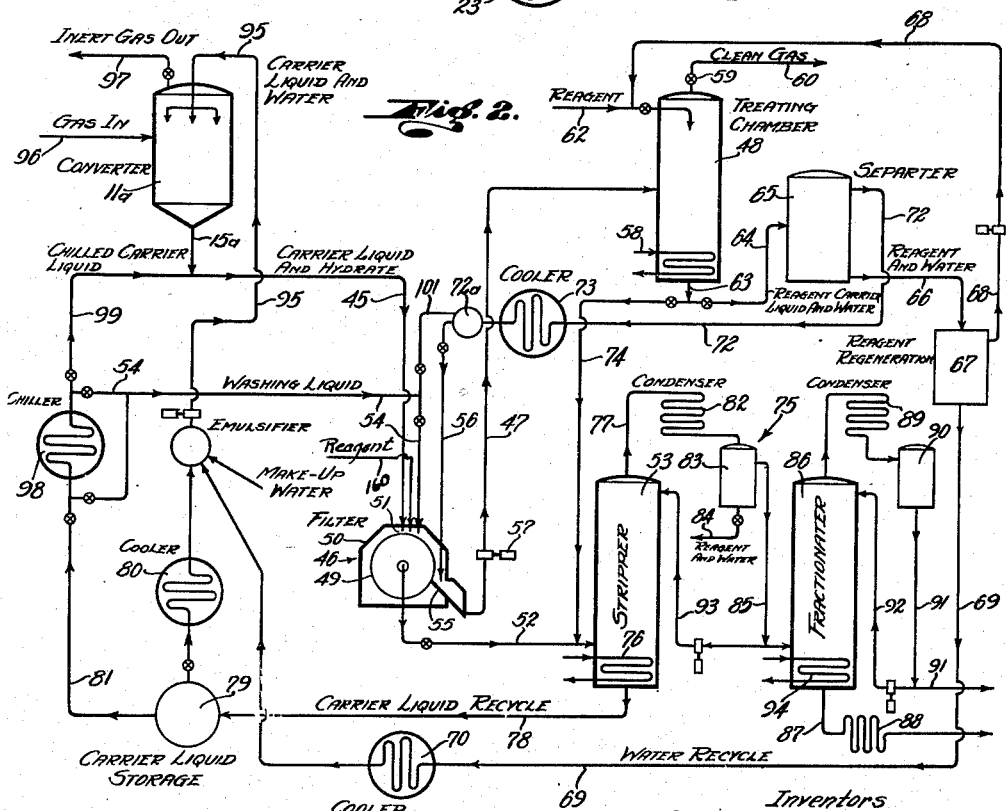
Inventors
ARTHUR J. L. HUTCHINSON
and
IRA C. BECHTOLD
H. Calvin White
Attorney

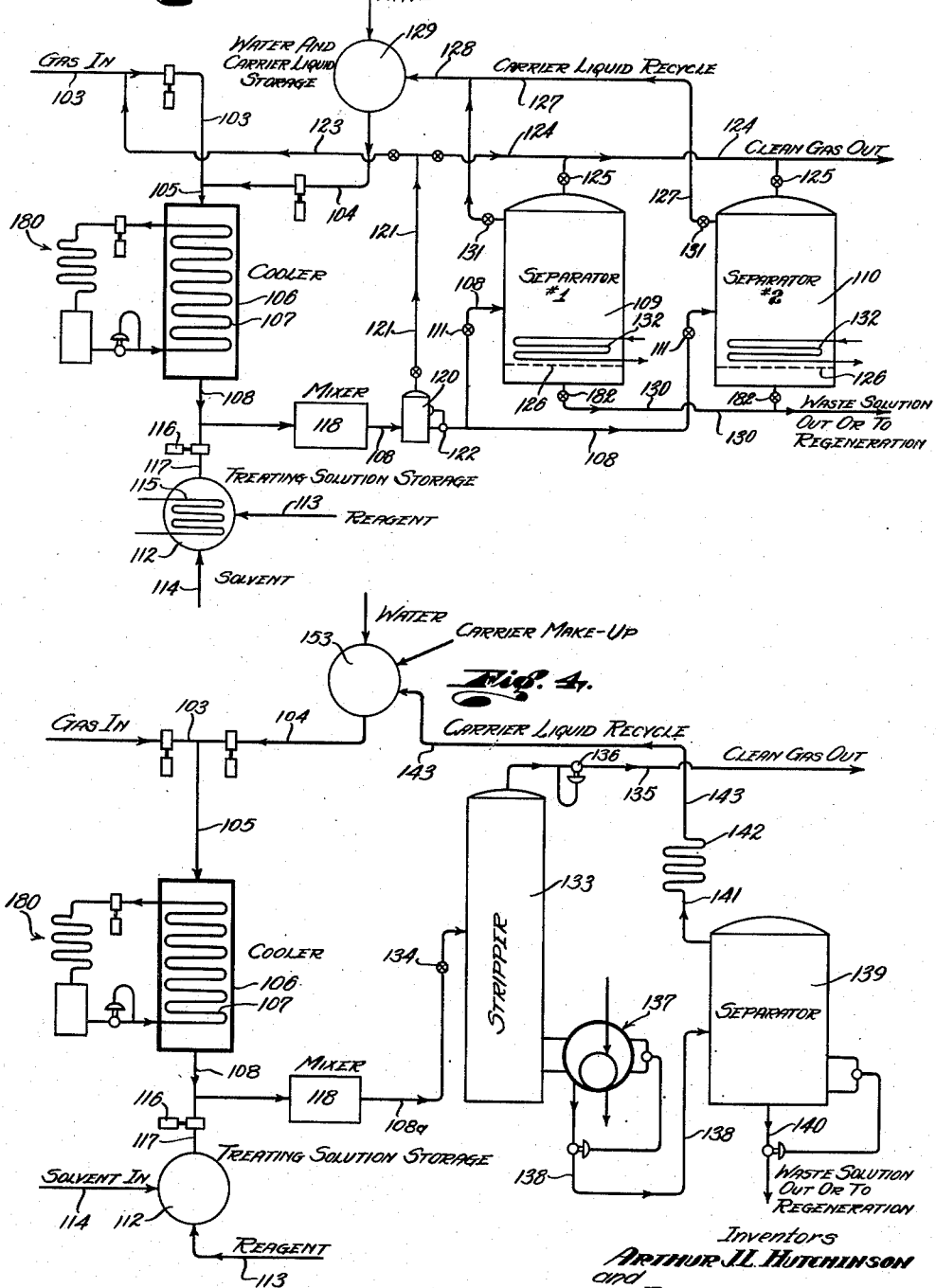

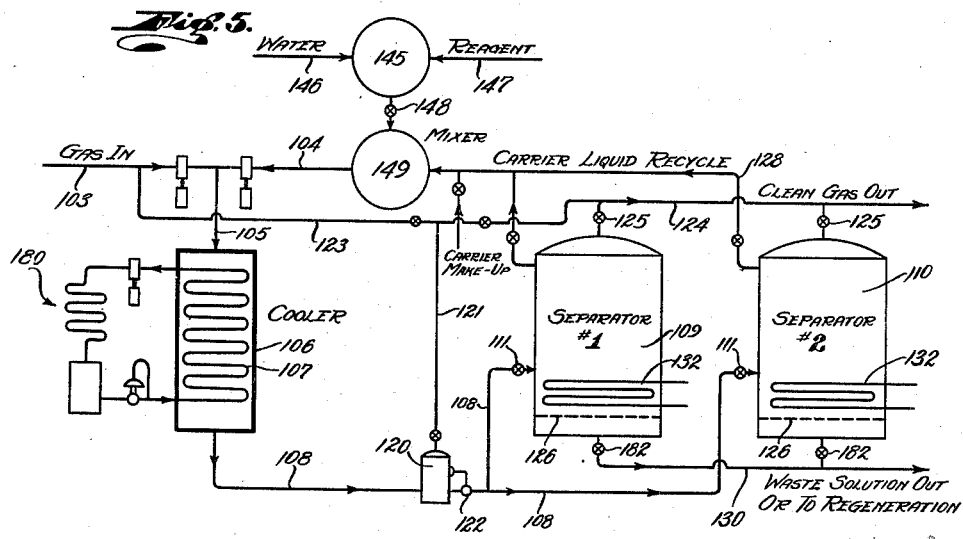
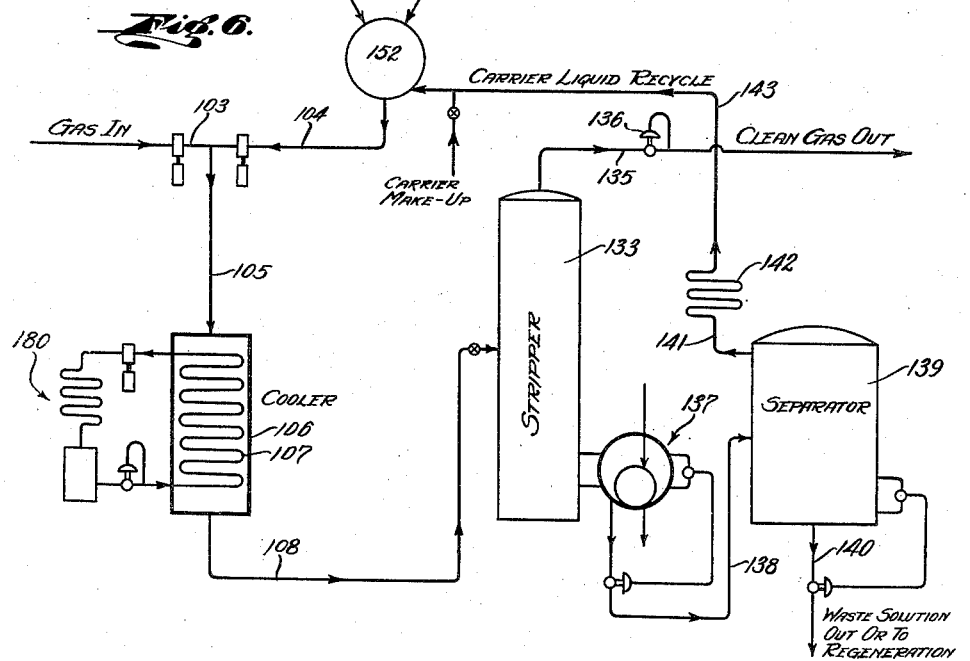

Patented May 8, 1945

2,375,560

UNITED STATES PATENT OFFICE 2,375,560

TREATMENT OF GASES

Arthur J. L. Hutchinson and Ira C. Bechtold, Los Angeles, Calif., assignors to The Fluor Corporation, Ltd., Los Angeles, Calif., a corporation of California Application October 27, 1941, Serial No. 416,775

20 Claims. (Cl. 23—3)

This invention may be regarded broadly as having to do with the treatment of normally gaseous substances capable of forming solid hydrates (i. e., water-addition products), or of normally gaseous mixtures of constituents, one or more of which form solid hydrates, with reagents whose effect upon, or reaction with, the substance or mixture constituent is improved by their being in a condition of high molecular concentration. The invention contemplates new methods whereby such molecular concentration is obtained as a result of solid hydrate formation, and the substance or gas mixture constituent is treated with a reagent when thus concentrated.

Various processes are used for treating gas with a reagent to produce some desired effect upon the gas, as to remove impurities therefrom. Illustrative are methods for removing acidic impurities including carbon dioxide, hydrogen sulphide, and sulphur dioxide, or inert gases such as nitrogen and helium, from gaseous mixtures such as natural gas, and certain of the same impurities from oil refinery gases. Such processes operate to contact the gas, as such, with the treating reagent, and necessitate the use of equipment designed particularly to bring the gas into very intimate and repeated contacts with the reagent. One principal reason for this is that the constituents of the gas to be treated or removed by the reagent, are in a state of relatively great molecular dispersion since they are gaseous, and usually such dispersion is made still greater by mixture or dilution with other gas. Accordingly, since the effectiveness of the reagent is dependent upon its ability to reach or contact the molecules of the substance to be acted upon by the reagent, it becomes necessary to use a treating system wherein the reagent has repeated opportunities to contact the gas, as by the use of series of bubble trays, liquid sprays and various other known devices. Even then, however, the treating agent is not afforded an opportunity for most efficient action, from standpoints of time or completeness of action or reaction, because of the inherent state of molecular dispersion of the substance to be contacted.

In its more general aspects, the present invention contemplates effecting molecular concentration of a normally gaseous substance, or one or more constituents of a gaseous mixture, for treatment by a reagent without limitation as to the specific purpose or composition of the reagent, so long as the efficiency of the reagent is enhanced by molecular concentration of the substance on which the reagent is intended to act. Therefore, it is merely by way of illustration that we may refer typically to the treatment of hydrocarbon gases such as natural gas, or gases from straight-run or cracking plants, by a reagent capable of reacting with and removing acidic impurities of the nature indicated above, or any other constituents such as sulphur-containing hydrocarbons with which the reagent may be reactive. Typical of contemplated reagents are basic solutions, e. g., water solutions of caustic soda or other reactive metal hydroxides, basic or acidic salt solutions, or for some purposes, solutions of acidic reagents where the gas contains impurities of a basic nature. Also contemplated are the various acid gas reactive amines, particularly the aliphatic amines, of which monoethanolamine, diethanolamine, and triethanolamine are typical.

Briefly, the present processes contemplate forming high molecular concentrations of the normally gaseous substance to be treated, either in solid form, or fluid phase (liquid or gas), by virtue of the conversion of a portion or all of the hydrate-forming constituents of the gas, into solid form. The concentration is in the solid phase when the substance to be treated is itself converted into the hydrate. Otherwise, the concentration may be of a subtractive nature in the sense that residual fluid remaining after hydration of some constituents of the gas, is concentrated by elimination from the fluid phase of those constituents converted to hydrates. Under circumstances involving such subtractive concentration, as the term has been explained, the treating efficiency of the reagent is enhanced by its action upon or reaction with a constituent molecularly concentrated in liquid phase, or in gaseous phase, depending upon the particular conditions existing in processing a given gas. The degree of molecular concentration is of course least in the gaseous phase, but nevertheless it may be far greater than the corresponding concentration in the untreated gas, wherein particular constituents may be greatly diluted by other gaseous substances.

Particular methods whereby the constituents of the raw gas may be treated by contacting the reagent with separated hydrates, or with a gas or gaseous mixture undergoing hydration, will be understood to better advantage without necessity for further preliminary discussion, from the detailed description to follow. Reference is had throughout the description to the accompanying drawings, in which:

Fig. 1 illustrates a relatively simple system in which the gas constituents to be treated are concentrated by the formation of hydrates which are accumulated in a treating chamber;

Fig. 2 shows a combined treating and distillate recovery system according to which hydrates being continuously separated from non-hydrated constituents of the gas, are subjected to continuous treatment by the reagent;

Fig. 3 illustrates a process whereby the constituents of a partially or totally hydrated gas stream are treated with reagent prior to separation of the hydrates from the stream;

Fig. 4 illustrates a similar system involving continuous decomposition of the hydrates and separation of the liberated gas;

Fig. 5 illustrates a further variational form of the invention in which the treating reagent is introduced with water to the raw gas stream; and Fig. 6 illustrates a similar system wherein the hydrates are continuously decomposed and the liberated gas separated from the residue.

The system shown in Fig. 1 involves a relatively simple method for converting constituents of the gas to be treated, into their solid hydrates, and for isolating or separating the hydrates so that the treating reagent acts upon constituents of the original gas that have been concentrated, either in solid or fluid phase, by virtue of the hydration. This type of system also may be employed to serve the purposes of the invention disclosed in the copending Hutchinson application, Serial No. 407,036, filed August 15, 1941.

The raw gas containing constituents to be treated, may be introduced through line 10 to the converter 11 without precooling, where the normal gas temperature is sufficiently low to permit proper conversion temperatures in the converter. Otherwise the gas may be precooled by passage through the cooler 12a. The gas stream introduced to the converter is intimately admixed with finely divided water particles injected from line 12 in the form of a spray or mist at the outlets 13. The water desirably may be intimately admixed or emulsified with a non-aqueous carrier liquid, such as kerosene distillate or gas oil, or a light mineral oil fraction, as an aid in promoting fine particle dispersion of the water and to facilitate transfer of the hydrate particles from the converter to the treating chamber by entrainment of the particles in the carrier liquid. Generally speaking, temperature and pressure conditions in the converter may be controlled in accordance with the desired conversion into hydrates of the hydrate-forming constituents of the gas. For purposes of illustration, we may assume that gas introduced through line 10 is a natural gas, although the invention is not so limited, consisting of hydrocarbons included in the methane, ethane, propane, and butane series (including isomers), together with impurities such as carbon dioxide, hydrogen sulphide, and sulphur dioxide, or in fact any constituents or impurities which are to be removed by treatment with a reagent as later described. Merely as illustrative, the temperature of the water-gas mixture in the converter may range between about 35° F. to 40° F. and the pressure between 25 to 650 lbs. per sq. in. gauge, depending upon the composition of the gas. The converter chamber 11 may be thermally insulated or cooled in any suitable manner, as by the provision of a jacket diagrammatically indicated at 14.

The hydrate particles formed in the converter 11 are entrained in the stream of carrier liquid and discharged from the bottom of the converter through line 15 into pipe 16, through which the mixture is transferred to the treating chamber 17. Removal of the hydrate-carrier liquid mixture from the converter, and its flow into the treating chamber, may be aided by injecting into line 16, as diagrammatically illustrated at 18, a stream of cooled carrier liquid recirculated to line 19, as will later appear.

A body of the hydrates is permitted to accumulate within the treating chamber 17, as by retaining the hydrates above an apertured or liquid-permeable floor 20 through which the carrier liquid is withdrawn to the bottom outlet line 21. The carrier liquid then may be recirculated by pump 22 through cooler 23, wherein the liquid may be cooled to a temperature above or below the freezing temperature of water. The cooled carrier liquid thence recirculates through line 24 for delivery to line 19, and to be admixed in line 12 with water introduced to the system through line 25. A portion of the cooled carrier liquid may be circulated through lines 26 and 27 into jacket 28 or coil 29 for purposes of cooling or refrigerating the treating chamber to stabilize the accumulated hydrates. The carrier liquid then recirculates through lines 30 or 31 into pipe 32 returning to line 21. An independent cooling (or heating) fluid may be passed through the treating chamber cooling system from inlet 33 to the outlet 34.

The concentration of those constituents of the raw gas to be treated with a selected reagent, may occur in the form of the hydrates of those constituents accumulated in the treating chamber 17. The treating process may serve not only the purpose of contacting the hydrated constituents with the reagent, but also to decompose a portion or all of the hydrates to liberate gas. Thus, for example, after the hydrates have been accumulated in chamber 17, valves 35 and 36 may be closed, and the reagent, or a solution of the reagent proper, introduced to the chamber through lines 37 and 16 so as to directly contact and act upon or react with the hydrated constituents to be treated. The reagent may be heated, as by passage through the heater 38, to a temperature sufficient to cause the desired decomposition of the hydrates. Instead of using heated reagents, unheated reagent may be introduced through the heater by-pass line 39 and any desired heating of the hydrates accomplished by circulation of heating fluid through coil 29. Following treatment of the hydrates and liberation of the clean gas through the valved outlet line 40, the residual water and spent reagent may be withdrawn from the chamber through the bottom outlet 21 and valved line 41.

Concentration of constituents of the raw gas to be treated may also occur in a subtractive sense, i. e., by a process of concentration resulting from the conversion of other constituents of the gas to their solid hydrates. To illustrate, the conditions existing in the converter 11 may transform into hydrates those constituents of the gas which are not to be reagent-treated, or which it may be desired to treat separately from residual unconverted constituents of the gas. The latter, concentrated by the hydrate formation, may be withdrawn from the converter through line 42 and suitably treated with the reagent, as by passing the gas through a chamber 43 to which the reagent is introduced through line 44. The clean treated gas is withdrawn through line 43a and the spent reagent taken from the bottom of the chamber through line 43b for regeneration or other disposal.

The flow diagram of Fig. 2 illustrates a system similar in certain broad aspects to that described with reference to Fig. 1, but differing in the method of separating the hydrates from the carrier liquid and non-hydrated constituents of the gas, and providing for continuous decomposition of the separated hydrates.

This system further is particularly adapted to the treatment and separation from the hydrates of non-hydrate forming constituents of the raw gas, such as gasoline fractions, which the raw gas in this instance may be assumed to contain. Thus the converter 11a here serves to transform into hydrates all or a predetermined portion of the potential hydrate-forming constituents of the gas, leaving unconvertible and condensed liquid hydro-carbon fractions of the gas for removal, as such, with the carrier liquid and formed hydrates, through line 15a.

Instead of delivering the hydrates for accumulation within a separating zone, as in the previous instance, Fig. 2 shows the carrier liquid-hydrate-hydrocarbon stream taken from the converter 11a to be discharged through line 15a to a filtering zone, generally indicated at 46, within which a continuous stream of the hydrates is removed from a non-hydrated liquid, and transferred through line 47 to a hydrate decomposition chamber or gas generator 48. Here the separating medium is shown typically to comprise a diagrammatically illustrated rotary filter of the usual known type, and comprising a filter drum 49 rotated in the direction of the arrow and contained within a housing 50 of sufficient strength to withstand hydrate stabilizing pressures. The stream in line 45 is discharged at 51 onto the filter surface of the drum 49; and by the maintenance, as usual, of somewhat lower pressure inside the drum, all fluid constituents of the mixture are drawn through the filter into the drum and discharged through line 52 to the stripper 53.

In order that the hydrates may be freed of any residual high boiling hydrocarbons that otherwise might contaminate or undesirably affect the desired properties of the gas to be generated, the hydrates separated on the surface of the filter 49 preferably are washed with a hydrocarbon solvent before removal from the drum. This washing liquid may conveniently consist of cooled carrier liquid directed from line 54 against the hydrate crust on the filter at a suitable location in advance of the point at which the hydrates are removed. As will be understood, the washing liquid also is drawn into the filter and discharged through line 52 to the stripper. The hydrates are removed from the filter by the usual scraper edge 55 and immediately are entrained in a stream of carrier liquid introduced to the filter through line 56 to form a mixture that can be forced by pump 57 through line 47 to chamber 48.

The hydrate-carrier liquid mixture in chamber 48 may be temperature controlled, independently of the treating reagent, by any suitable means such as heating or cooling coil 58, and the hydrates may be decomposed and the gas liberated at any desired pressure determined by the temperature of decomposition and the setting of the back pressure valve 59 in the gas outlet line 60. According to the system of Fig. 2, the hydrate stream introduced to chamber 48 from line 47 is continuously contacted by a stream of the reagent discharged into the chamber through line 62. As before, the reagent may be preheated to supply the heat necessary for decomposition of the hydrates, or such heat may be independently supplied as by heating coil 58. Being intimately admixed in the treating chamber with the hydrate-carrier liquid stream from line 47, the reagent effectively reacts with the hydrated constituents to be treated so that the gas liberated through line 60 is freed of impurities.

Assuming all the hydrates to be decomposed in chamber 48, the residual carrier liquid, water, and spent reagent, may continuously be discharged through lines 63 and 64 into separator 65, from the bottom of which the water and spent reagent are withdrawn through line 66 to suitable equipment, diagrammatically indicated at 67, for regenerating the reagent and separating it from the water. The reagent thence may be recirculated through line 68 to the treating chamber, and the separated water recycled through line 69 and cooler 70 to the emulsifier 71. From separator 65, the upper stratum carrier oil is recirculated through line 72, cooler 73 into accumulator 72a, and thence through line 56 to reentrain the hydrates being removed from the filter drum 49.

It is contemplated that where operating conditions permit, the carrier liquid, residual water, and spent reagent may be taken from the treating chamber 48 through line 74 for further treatment in the stripper and fractionating system, generally indicated at 75. According to this method of operation, the fluid mixture in line 74 is introduced to the stripper along with the carrier liquid and any liquid non-hydrated fractions of the original gas, withdrawn from the filter through line 52. By suitably heating the mixture in the stripper, as by coil 76, all materials having boiling temperatures lower than that of the carrier liquid, are vaporized and removed through line 77, leaving the separated carrier liquid to be recirculated through line 78 to storage zone 79, thence to be taken through the cooler 80 to emulsifier 71 for return to the converter 11a, and through line 81 for more direct recirculation to the filtering zone, as will appear.

Where certain types of reagents are used, such as the amines reactive with acidic constituents of the gas or hydrates, regeneration of the reagent may result from its vaporization from the stripper 53. Typically, the vapor mixture may be passed through condenser 82 and the condensate, including the reagent, water, and light hydrocarbons, received within an accumulator 83, from which the regenerated reagent and water are withdrawn through line 84 for further separation or recirculation to the treating chamber 48, as may be desired. The higher stratum hydrocarbons may be taken off through line 85 to the fractionator 86 and therein subjected to fractional separation into a relatively heavy cut (e. g., stabilized gasoline) withdrawn through line 87 to final cooler 88, and a light overhead fraction recovered from condenser 89 in a receiver 90. The light product will be withdrawn through line 91 and a portion recirculated to the fractionator through line 92 as reflux, as may be recirculated to stripper 53 through line 93 a portion of the condensate fed to the fractionator through line 85. As will be understood, suitable means may be employed for supplying to the hydrocarbons introduced to the fractionator, heat required to vaporize the lighter constituents. A base heating coil 94 is shown as typical.

The recirculated carried liquid and water, together with any necessary make-up water, may be admixed or emulsified in vessel 71 and thence discharged through line 95 into the converter 11a to be admixed with the gas fed in through line 96. Any non-hydrated gas released from the converter through line 97 may or may not be treated with a reagent, as previously explained with reference to Fig. 1. A portion of the carrier liquid taken from storage 79 through line 81 may be passed through chiller 98 into line 99 from which the chilled carrier liquid is mixed with the carrier liquid-hydrate stream being discharged from the converter through line 15a. A portion of the chilled carrier may be returned through line 54 to the filter wherein the carrier is discharged onto the hydrate cake on the drum 49 for the purpose of removing from the hydrates, residual high boiling hydrocarbons as previously explained. Where recirculation of carrier liquid to the filtering zone through line 72 is not employed, the necessary carrier liquid may be supplied from line 54 through its valved connection 101 with the accumulator 72a.

It is also contemplated with respect to the process of Fig. 2 that the separated hydrates may be treated with the reagent prior to their introduction to the treating chamber 48. In some instances it may be desirable to contact the hydrate filter cake with a treating reagent of suitable character, as by discharging the reagent from line 160 at a suitable point on the filter surface in advance of the location 51 at which the liquid-hydrate mixture is directed against the filter. It will be understood that the hydrate cake may be treated with the washing liquid or hydrocarbon solvent, before or after contacting the hydrates with the reagent. Merely as illustrative, the reagent discharge from line 160 is shown to occur beyond the point of discharge from line 45 and in advance of the location at which the washing liquid from line 54 contacts the hydrate cake. The outlets from the several lines may of course be spaced about the filter surface as desired.

Figs. 3 and 4 illustrate another type of treating system embodying the invention, whereby the reagent is introduced to a mixture of hydrated and non-hydrated constituents of the gas prior to their separation. As before, concentration of the constituents desired to be treated may result from the hydration of those constituents, or from concentration in fluid phase by subtractive hydration of other constituents of the gas. Here the gas and water, or water-carrier liquid mixture, are fed through lines 103 and 104 into a mixing conduit 105 from which the gas-water mixture passes into a suitable cooling zone, shown typically as vessel 106 containing a cooling coil 107 through which a cooling fluid is circulated to and from the conventionally illustrated refrigeration system 180. By proper control of the pressure and temperature conditions, all or part of the hydrate-forming constituents of the gas are converted into solid hydrates, which in Fig. 3 are transferred in the carrier liquid stream through line 108 to one or the other of the separating zones 109, 110. As will be understood, where the hydrates are to be retained or accumulated in the separating zones, the valves in the outlets therefrom will be set to maintain hydrate stabilizing pressures in the separating zones. Also, if desired, the latter may be suitably insulated to minimize heat losses.

The reagent may be supplied from any suitable source, such as container 112 to which the reagent is introduced from line 113. If the reagent requires a solvent, such as water, the latter may be fed to the container as at 114. With or without precooling, as by coil 115 in the container, the reagent may be discharged at a metered rate by pump 116 through line 117 into the hydrate-carrier liquid stream in line 108. If necessary, the entire mixture may be subjected to extended comingling in a suitable mixer, as indicated at 118. Treatment of the gas constituents to be acted upon or reacted with the reagent occurs during the flow of the mixture through line 108 to the separating zone, and also during the time the materials are in contact within the separating zone. All gases present in the mixture may be suitably removed before introduction of the stream to the separator, as by placing in line 108 beyond the mixer 118 a gas separator 120 from which the gas flows through line 121, and from which the liquid is discharged through the usual liquid level controlled valve 122 in line 108. All or part of the gas thence may be recycled through line 123 to the raw gas line 103, or the separated gas may be discharged from the system through the outlet line 124. During this time, valve 125 in the gas outlet of the separator being charged with hydrates, is kept closed.

The on-stream separator may be filled with hydrates by permitting the latter to settle upon and accumulate above a fluid-permeable floor 126, and drawing off the carrier liquid through lines 127 and 128 for recirculation to the water and carrier liquid storage 129. The higher specific gravity spent treating reagent or solution may be withdrawn from the bottom of the separator through line 130 for disposal as waste solution or to be regenerated. After the separator is filled with hydrates, its valves 131 and 132 are closed and the mixing passage stream directed through line 108 into the other separator, from which a previous charge of hydrates may have been removed. The accumulated hydrates may be decomposed, as by heat supplied through coil 132, to liberate the clean gas to the outlet line 124, or the hydrates may be treated or disposed of in any other desired manner and for particular purposes with which the present invention is not concerned.

In the system shown in Fig. 4, the gas, water, and carrier liquid are admixed to produce a hydrate-forming composition, the mixture cooled and treated with a reagent introduced to the flow passage, all in a manner similar to the corresponding stage in the system of Fig. 3. Fig. 4 differs primarily in the provision for continuous decomposition of the hydrates and separation of the liberated gas from the carrier liquid and spent treating solution. Here the stream beyond the mixer 118 is discharged through line 108a into a separating zone 133 which may consist of a stripper column operating at relatively low pressure beyond the valve 134 at which the hydrates will decompose and liberate the hydrated gas to the outlet line 135. Any desired back pressure may be maintained on the stripper by valve 136 in the outlet line. Suitable provision may be made for removing all low boiling constituents or dissolved gases from the carrier oil, as by the usual reboiler, generally indicated at 137, at the base of the stripper. From reboiler 137 the carrier liquid and spent reagent pass through line 138 into chamber 139 within which the spent reagent settles to the bottom for removal through line 140. The lower specific gravity carrier liquid is taken off through line 141 and recirculated through cooler 142 and line 143 to be again mixed with water in container 153 and injected through line 104 into the raw gas stream.

The flow diagrams of Figs. 5 and 6 will be seen to correspond closely to those of Figs. 3 and 4, respectively. Accordingly, corresponding parts are given the same reference characters. According to the methods illustrated in Figs. 5 and 6, the reagent is introduced to the initially formed water and gas mixture, specifically and preferably by adding the reagent to the water, or the water and carrier liquid, and injecting the resulting mixture into the raw gas stream. Thus, as shown in Fig. 5, the water and reagent enter the mixing tank 145 through lines 146 and 147, and then pass through the valved line 148 and the mixer 149 to be admixed or emulsified with the carrier liquid being recirculated through line 128. When introduced through line 104 to the gas stream in line 105, the reagent is caused to act upon constituents of the gas to be treated, throughout the hydrate formation stage.

Similarly in Fig. 6, water and reagent delivered through lines 150 and 151 to the container 152 are admixed or emulsified with carrier liquid delivered through line 143, and the resulting mixture taken through line 104 into the raw gas stream.

The expression "undesired component" as used in the claims is intended, in a broad sense, to mean a component which it is not desired, for any reason, to retain, or to retain as such, in the mixture treated, and is intended in a narrower sense to mean a component which may be objectionable per se, as because of its own particular composition, properties, or lack of qualities desired in the treated gas.

We claim:

1. The method of treating a normally gaseous mixture containing hydrate-forming components including an undesired component, that includes converting said components to their solid hydrates, treating the resulting hydrate mixture with a reagent reactive with said undesired component, separating the reaction product, and recovering the purified remaining material.

2. The method of treating a normally gaseous mixture containing hydrate-forming hydrocarbon components and an undesired hydrate-forming, non-hydrocarbon impurity to be removed from the mixture, that includes converting said components and impurity to their solid hydrates, treating the resulting hydrate mixture with a reagent reactive with said impurity, separating the reaction product, and recovering the purified remaining material.

3. The method of treating a normally gaseous mixture containing hydrate-forming hydrocarbon components and an undesired hydrate-forming, acidic impurity to be removed from the mixture, that includes converting said components and impurity to their solid hydrates, treating the resulting hydrate mixture with an alkaline reagent reactive with said impurity, separating the reaction product, and recovering the purified remaining material.

4. The method of treating a normally gaseous mixture containing hydrate-forming hydrocarbon components and an undesired hydrate-forming, acidic impurity to be removed from the mixture, that includes converting said components and impurity to their solid hydrates, treating the resulting hydrate mixture with an amine reagent reactive with said impurity, separating the reaction product, and recovering the purified remainining material.

5. The method of treating a normally gaseous mixture containing hydrate-forming components including a hydrocarbon and an undesired component of the group consisting of hydrogen sulphide, carbon dioxide, and sulphur dioxide, that includes converting said components into their solid hydrates, treating the resulting hydrate mixture with a reagent reactive with said undesired component, separating the reaction product, and recovering the purified remaining material.

6. The method of treating a normally gaseous mixture containing hydrate-forming components including an undesired component, that includes converting said components to their solid hydrates, treating the resulting hydrate mixture with a reagent reactive with said undesired component, separating the spent reagent from the purified remaining material, recovering said purified remaining material, regenerating the reagent, and returning the regenerated reagent for treatment of additional hydrated components of the first mentioned mixture.

7. The method of treating a normally gaseous mixture containing hydrate-forming components including an undesired component, that includes converting said components to their solid hydrates and thereby forming a mixture of the hydrates with non-hydrated fluid components of the first mentioned mixture, treating the resulting hydrate-fluid mixture with a reagent reactive with said undesired component, separating the reaction product, and recovering the purified remaining material.

8. The method of treating a normally gaseous mixture containing hydrate-forming components including an undesired component, that includes converting said components to their solid hydrates, separating the hydrates from non-hydrated constituents of the mixture, treating the resulting hydrate mixture with a reagent reactive with said undesired component, separating the reaction product, and recovering the purified remaining material.

9. The method of treating a normally gaseous mixture containing hydrate-forming components including an undesired component, that includes contacting said mixture with water under temperature and pressure conditions causing formation of the hydrates of said component, continuously separating non-hydrated fluid from a stream of the hydrates, treating the resulting hydrate mixture with a reagent reactive with the hydrated undesired component, separating the reaction product, and recovering the purified remaining material.

10. The method of treating a normally gaseous hydrocarbon mixture containing hydrate-forming components including an undesired acidic component, that includes contacting said mixture with water under temperature and pressure conditions causing formation of the hydrates of said components, continuously separating gaseous constituents of the mixture from the hydrates, treating the resulting hydrate mixture with a reagent reactive with the hydrated undesired component, separating the reaction product, and recovering the purified remaining material.

11. The method of treating a normally gaseous hydrocarbon mixture containing hydrate-forming components including an undesired component, that includes contacting said mixture with water under temperature and pressure conditions causing formation of the hydrates of said components, separating non-hydrated fluid from the hydrates and storing the hydrates under stabilizing temperature and pressure, treating the stored hydrates with a reagent reactive with the hydrated undesired component, separating the reaction product, and recovering the purified remaining material.

12. The method of treating a normally gaseous mixture containing hydrated-forming components including an undesired component, that includes contacting said mixture with water under temperature and pressure conditions causing formation of the hydrates of said components, separating non-hydrated fluid from the hydrates, treating and decomposing all the hydrates with a reagent reactive with the hydrate of said undesired component, separating the reaction product, and recovering the purified remaining material.

13. The method of treating a normally gaseous mixture containing hydrate-forming components including an undesired component, that includes contacting said mixture with water and a water-immiscible hydrate carrier liquid under temperature and pressure conditions causing formation of said hydrates, separating said carrier liquid from the hydrates, treating the hydrates with a reagent reactive with the hydrated undesired component to remove said undesired component, separating the reaction product, and recovering the purified remaining material.

14. In processing a normally gaseous mixture containing hydrate-forming components including an undesired component, the method that includes treating a stream of said mixture with water and a reagent under temperature and pressure conditions causing formation of the hydrates of said components, said reagent being reactive with the hydrate of said undesired component to permit its removal, separating the reaction product, and recovering the purified remaining material.

15. In processing a normally gaseous mixture containing hydrate-forming components including an undesired component, the method that includes treating a stream of said mixture with water, a water-immiscible carrier liquid, and a reagent under temperature and pressure conditions causing formation of the hydrates of said components, said reagent being reactive with the hydrate of said undesired component to permit its removal, separating the reaction product, and recoverying the purified remaining material.

16. In processing a normally gaseous mixture containing hydrate-forming components including an undesired component, the method that includes treating a stream of said mixture with water, a mineral oil fraction, and a reagent under temperature and pressure conditions causing formation of the hydrates of said components, said reagent being reactive with the hydrate of said undesired component to permit its removal, separating the reaction product, and recovering the purified remaining material.

17. In processing a normally gaseous mixture containing hydrate-forming components including an undesired component, the method that includes treating a stream of said mixture with water, a water-immiscible hydrate carrier liquid and a reagent to form a mixture of the hydrates of said components and impurity, passing the resulting mixture in a state of turbulent flow through an elongated passage of relatively small cross-sectional area, said reagent being reactive with the hydrate of said impurity to permit its removal from the materials mixed therewith, separating the reaction product, and recovering the purified remaining material.

18. In processing a hydrocarbon gas containing hydrate-forming components and a hydrate-forming acidic impurity to be removed, the method that includes treating a stream of the gas with a mixture of water and a reagent to form a mixture of the hydrates of said components and impurity, said reagent being reactive with the hydrate of said impurity, separating the spent reagent from the hydrate mixture, recovering the purified remaining material, and regenerating the reagent and returning it to said stream.

19. In processing a gas containing hydrate-forming hydrocarbon components and a hydrate-forming impurity to be removed, the method that includes introducing to a stream of the gas a mixture of water and a reagent to form a mixture of the hydrates of said components and impurity, said reagent being reactive with the hydrate of said impurity, separating the spent reagent from the hydrate mixture, and recovering the purified remaining material.

20. In processing a normally gaseous mixture containing hydrate-forming components including an undesired component, the method that includes treating a stream of said mixture with water, a water immiscible hydrate carrier liquid and a reagent to form a mixture of the hydrates of said components and impurity, said reagent being reactive with the hydrate of said impurity, separating the spent reagent and carrier liquid from the hydrate mixture, recovering the purified remaining material, separating the spent reagent and carrier liquid, regenerating the reagent, and returning the regenerated reagent and separated carrier liquid to said stream.

IRA C. BECHTOLD.
ARTHUR J. L. HUTCHINSON.